United States Patent

Reader et al.

[15] 3,673,158
[45] June 27, 1972

[54] SULFOBETAINE GLYCOL MODIFIED POLY(ETHYLENE TEREPHTHALATE)

[72] Inventors: Arthur M. Reader, Corpus Christi, Tex.; Robert W. Stackman, Morris Township, Morris County, N.J.

[73] Assignee: Celanese Corporation, New York, N.Y.

[22] Filed: Aug. 14, 1970

[21] Appl. No.: 70,615

Related U.S. Application Data

[63] Continuation of Ser. No. 838,033, June 23, 1969, abandoned, which is a continuation of Ser. No. 604,138, Dec. 23, 1966, abandoned.

[52] U.S. Cl. ..........................260/75 N, 8/DIG. 4, 8/DIG. 21, 260/75 S, 260/78 R, 260/501.12

[51] Int. Cl. .....................................C08g 17/08, C08g 20/20
[58] Field of Search...........................260/75 N, 75 S, 501.12; 8/55 C, 86, DIG. 4

[56] References Cited

UNITED STATES PATENTS 3,238,180   3/1966   Wiloth.....................................260/47

Primary Examiner—Melvin Goldstein
Attorney—L. I. Grim

[57] ABSTRACT

Sulfobetaine glycols prepared by reaction of bis (hydroxyalkyl) amines with sultones are incorporated into polyesters and polyamides to improve dyeability.

4 Claims, No Drawings

SULFOBETAINE GLYCOL MODIFIED POLY(ETHYLENE TEREPHTHALATE)

This application is a continuation of application Ser. No. 838,033, filed June 23, 1969, which was in turn a continuation of Ser. No. 604,138, filed Dec. 23, 1966, both now abandoned.

This invention relates to novel nitrogen-containing sulfonated salts, the process for preparing same, combinations of said novel nitrogen-containing sulfonated salts with synthetic linear thermoplastic polymers and shaped articles produced therefrom. More particularly, the invention is directed to the preparation of novel salts of sulfobetaine glycols which when incorporated in synthetic linear thermoplastic polymers can provide articles such as films, fibers and the like, having an affinity for basic type dyes.

Successful methods have been suggested in the past to improve the dyeability of shaped articles made from synthetic polymers such as fibers, fabrics or films, especially utilizing basic dyes to provide brighter colors and also to permit cross dyeing of the articles. These methods utilize the techniques of incorporating sulfonated monomers into synthetic polymers such as polyester, nylon, polypropylene and the like to provide copolymers. Typical of this procedure is U.S. Pat. No. 3,018,272, which describes the process of producing basic dyeable polyesters having incorporated therein as comonomers, the sulfonated monomers. Although these copolymers provide satisfactory basic dyeable materials, other suitable materials are being sought to provide improvements in dyeability for the synthetic linear thermoplastic polymers.

Novel nitrogen-containing salts of sulfobetaine glycol have been discovered which can be successfully utilized in the incorporation of these novel salts into synthetic linear thermoplastic polymers to provide a basic dyeable polymer and end products thereof.

The novel nitrogen-containing salts of sulfobetaine glycol of this invention can be represented by the following formula:

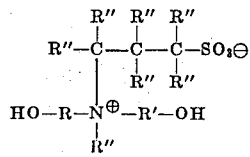

wherein R and R', individually, represent alkylene radicals containing from one to eight carbon atoms and R'' individually, represents hydrogen and an alkyl radical containing from one to eight carbon atoms.

The novel class of nitrogen-containing salts of sulfobetaine glycol of this invention can be prepared by the reaction of at least equimolar quantities of hydroxy containing amines with sultones at temperatures in the range from about 25° C. to about 150° C. The hydroxy containing amines can be described using the following formula:

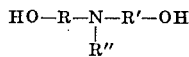

wherein R and R', individually, represent alkylene radicals containing from one to eight carbon atoms and R'' represents hydrogen and an alkyl radical containing from one to eight carbon atoms. Suitable amines falling within this category include among others, diethanolamine; dipropanolamine; dibutanolamine; dihexanolamine; dioctanolamine; N-ethyl, N,N-di(2-hydroxylethyl)amine; N-ethyl, N,N-di(3-hydroxypropyl)amine; N-propyl, N,N-di(3-hydroxypropyl)amine; N-hexyl, N,N-di(6-hydroxyhexyl)amine; N-octyl, N,N-di(8-hydroxyoctyl)amine and the like.

The sultones which are reacted with the dihydroxy amines can be described generically in the following formula:

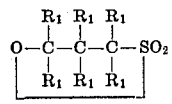

werein R1 individually, represents hydrogen or alkyl radicals containing from one to eight carbon atoms. Suitable sultones include among others: 1,3-propane sultone; 1,3-butane sultone; 1,3-isohexane sultone; 1,3-hexane sultone, and the like.

The temperature conditions utilized in the preparation of the salts of a sulfobetaine glycol of this invention range from about 25° C. to about 150° C., preferably from about 25° C. to about 100° C. The reaction can be carried out at atmospheric pressure, superatmospheric pressures or subatmospheric pressures, as is convenient. The reaction products recovered from this process can be purified by ordinary means such as recrystallization, distillation or the like.

The salts of sulfobetaine glycol of this invention can be incorporated into synthetic linear thermoplastic polymers during the preliminary stages of the polymerization of the polymers or during the latter stages of the polymerization. The combination of the salts of sulfobetaine glycol and synthetic linear thermoplastic polymers is, generally, in the form of a copolymer which is useful in the production of shaped articles by extrusion, molding, casting or the like. These shaped articles in turn can include fibers (filaments and staple), fabrics, ornaments, film and the like.

The presence of the salts of sulfobetaine glycol in the synthetic linear thermoplastic polymers is to provide dye sites especially for basic dyes. It is usually desirable to use at least about 0.5 weight percent of the sulfobetaine glycol salt based on the total polymer. Polymers having sulfobetaine glycol salts content lower than 0.5 weight percent will usually have only a relatively low affinity for basic dyes. Polymers containing about 10 weight percent of the sulfobetaine glycol salt have a very high affinity for basic dyes. Higher concentrations will not lead to appreciable increases in basic dyeability and in general may unduly affect tenacity in the shaped articles. The sulfobetaine glycol salt concentrations in the range from 2 to 8 weight percent of the total polymer are preferred.

The term "linear thermoplastic polymer" as used herein includes polymeric polymethylene terephthalates, especially preferred is polyethylene terephthalate. Other polymers which can be included herein utilized herein are polyalkylene terephthalate containing modifiers such as dibasic acids including among others; isophthalic acid, sebacic acid, adipic acid and the like. Cyclic glycols can also be substituted for the alkylene glycols in the linear terephthalate polymers. Other polymers included herein are polyamides such as polyhexamethylene adipamide, polyhexamethylene sebacamide, polytetramethylene sebacamide, polytetramethylene adipamide and the like. Other polyamides include those prepared from di(4-aminocyclohexyl) ethane or 1,6-(4-aminocyclohexyl)hexane as the diamine components. Additional polymers include polypropylene, polybutenes and the like. As is known, the intrinsic viscosities measured in a mixture of 58.8 parts of phenol and 41.2 parts of trichlorophenol of the above-described polymers should be in excess of 0.2, preferably in the range from 0.4 to 1.0 when used for producing textile and industrial products.

Various other materials may be present in the present new compositions. For example, such ester exchange catalysts as salts of calcium, magnesium, manganese and the like and such polymerization catalysts as antimony oxide, antimonic acid or the like, may be used. In addition, pigments, delusterants, or other additives such as titanium dioxide or barium carbonate.

The yarns or filaments produced in accordance with the present invention are suitable for the usual textile applications. They may be employed in the knitting or weaving of fabrics of all types as well as in the production of nonwoven, felt-like products produced by known methods. Their physical properties closely parallel those of their related non-modified polymer fibers. However, they have particular sensitivity toward basic dyes. By a "basic dye" is meant a colored cationic organic substance such as those containing sulfonium, oxonium or quaternary ammonium functional groups. Among the basic types which may be applied to the filaments formed in accordance with the present invention may be mentioned Victoria Green WB(C.I. 657); Thodamine B(C.I. 749); Brilliant Green B(C.I. 662); Victoria Pure Blue BO (Pr 198); Sevron Blue B; and the like. The dyes are preferably applied from an aqueous solution at a temperature between 80° and 125° C.

Filaments and films, i.e., shaped structures which have at least one dimension relatively very small and at least one dimension relatively large, are the preferred structures of the present invention. Such structures of the polymer compositions of this invention are permeated uniformly throughout by basic dyes applied from hot aqueous solution. The penetration of dyes is an important characteristic since poor resistance of fading and loss of color through rubbing or abrasion is a known characteristic of structures which retain dye only at their surfaces.

The following examples will serve to illustrate the invention:

EXAMPLE I

In a reaction flask was added one mole N-ethyl, N,N-di(2-hydroxyethyl)amine and one mole of 1,3-propane sultone. The resulting mixture was reacted for 2 hours at 30° C. to produce a salt of a sulfobetaine glycol having the formula:

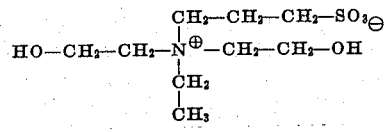

In another manner N-Ethyl N,N-di(2-hydroxyethyl)amine 488.5 grams (4 moles) and propane sultone 532.7 grams (4 moles) were added into 2,500 milliliters of methylene chloride and mixed in a 5 liter 3 necked flask. These materials were mixed at a temperature between 25° to 40° C. for 6 hours and 45 minutes. The solid which was formed on cooling was filtered from the solution obtaining 659 grams of the sulfobetaine glycol described in the formula above. The melting point of this product after washing with hot chloroform was 202.5°–203° C.

In like manner as above the following amines can be utilized as a starting product: diethanolamine, dihexanolamine, N-hexyl, N,N-di(6-hydroxyhexyl)amine and the like.

EXAMPLE II

Into a 500 ml. three necked flask, equipped with stirrer, nitrogen, inlet, and distilation head, was placed an ethylene glycol slurry of 140 mg. antimonic acid, a solution of 5.10 grams of the sulfobetaine glycol of Example I (2.5 mole percent sulfobetaine glycol based on polymer repeat unit) in ethylene glycol, and 200 grams of bis-hydroxyethyl terephthalate. The reaction flask was flushed three times with nitrogen, then heated, by means of an oil bath, to 215°–200° C. The molten monomer mixture was stirred at 220°–250° C. for one hour while ethylene glycol slowly distilled over. The temperature was then increased to 270° C. and the pressure slowly reduced to the lowest possible value over a period of 20 minutes. The temperature was increased to 290° C. and the polymerizing mixture stirred for 2 hours. At the end of this period the stirrer was stopped, the vacuum relieved by admitting nitrogen, the oil bath removed, and the flask shielded. When the polymer cooled the flask shattered and the polyester was recovered as a solid block.

The polyester copolymer was spun into fibers from a melt index apparatus at 285° C. and hand drawn over a heated shoe at 80° C. The crudely spin, hand-drawn fibers exhibited excellent washfast basic dyeability when dyed with a Sevron Blue B basic dye bath. The fibers were not acid dyeable, however.

In a similar manner as above, polyhexamethylene adipamide can be substituted for the polyethylene terephthalate.

It is understood that the foregoing description is merely illustrative of preferred embodiments of the invention of which many variations may be made by those skilled in the art within the scope of the following claims without departing from the spirit thereof.

We claim:

1. A composition consisting essentially of poly(ethylene terephthalate) and from about 0.5 to about 10 percent (by weight of polyester) of a nitrogen-containing salt of sulfobetaine glycol, wherein:
   a. said salt is prepared by reacting a sultone with a dihydroxy amine wherein:
      1. said sultone is selected from the group consisting of 1,3-propane sultone, 1,3-butane sultone, 1,3-isohexane sultone, and 1,3-hexane sultone;
      2. said amine is selected from the group consisting of diethanolamine; dipropanolamine; dibutanolamine; dihexanolamine; dioctanolamine; N-ethyl, N,N-di (2-hydroxyethyl) amine; N-ethyl, N,N-di(3-hydroxypropyl) amine; N-propyl, N,N-di(3-hydroxypropyl) amine; N-hexyl, N,N-di(6-hydroxyhexyl)amine; and N-octyl, N,N-di(8-hydroxyoctyl)amine;
   b. said salt is of the formula

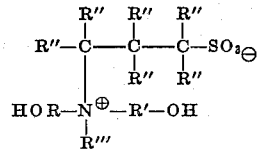

wherein:
      1. R and R' are independently selected from the group consisting of alkylene of one to about eight carbon atoms,
      2. R" and R''' are independently selected from the group consisting of hydrogen and alkyl of from one to about eight carbon atoms; and
   c. at least an equimolar amount of said dihydroxy amine is reacted with said sultone to produce said salt, said reaction occurring at a temperature of from about 25° to about 150° C.

2. The composition of claim 1, wherein:
   a. said salt comprises from about 2 to about 8 weight per cent of said polyester, and
   b. said salt is prepared by reacting said dihydroxy amine with a sultone selected from the group consisting of 1,3-propane sultone and 1,3-butane sultone at a temperature of from about 25° to about 100° C.

3. The composition of claim 2, wherein said salt is prepared by reacting said dihydroxy amine with 1,3-propane sultone and said dihydroxy amine is of the formula

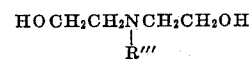

4. The composition of claim 3, wherein R''' is alkyl of two carbon atoms.

* * * * *